No. 757,998. Patented April 19, 1904.

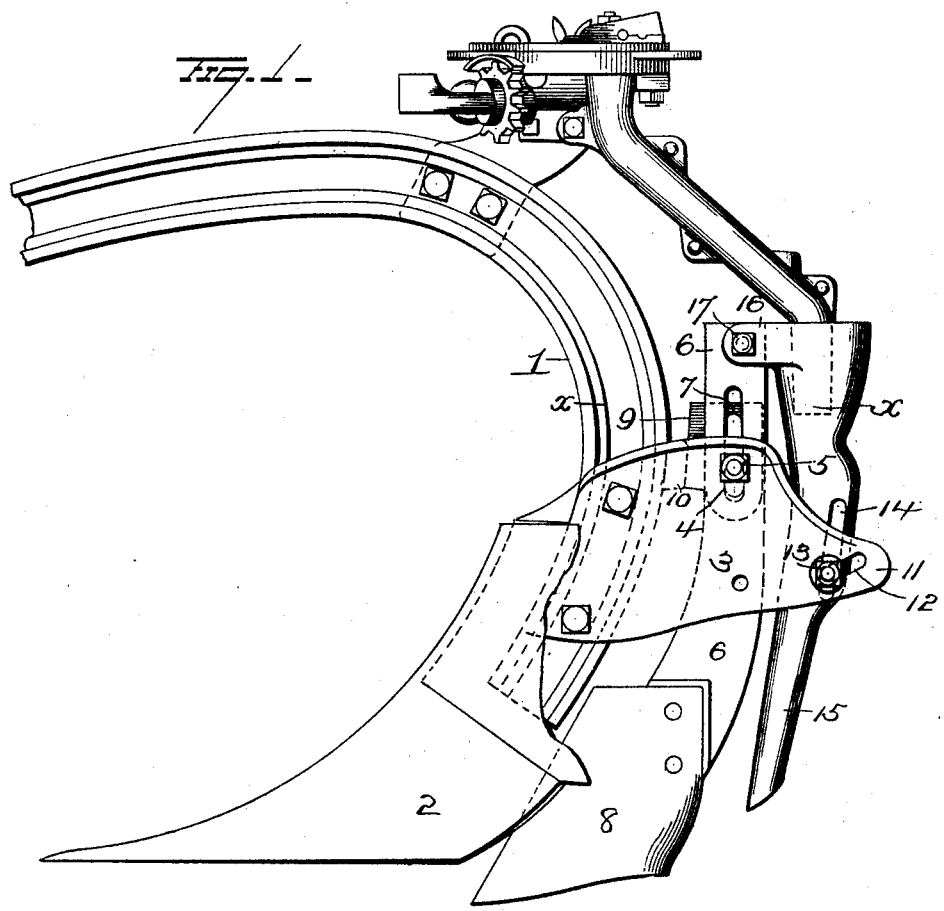
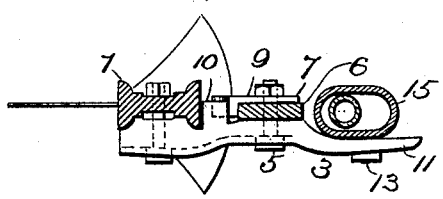

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

LISTER PLOW AND PLANTER.

SPECIFICATION forming part of Letters Patent No. 757,998, dated April 19, 1904.

Original application filed April 9, 1903, Serial No. 151,831. Divided and this application filed January 20, 1904. Serial No. 189,862.

(No model.)

*To all whom it may concern:*

Be it known that I, CALVIN R. DAVIS, a resident of South Bend, in the county of St. Joseph and State of Indiana, have invented certain new and useful Improvements in Lister Plows and Planters; and I do hereby declare the following to be a full, clear, and exact description of the invention, such as will enable others skilled in the art to which it appertains to make and use the same.

My invention relates to an improved lister plow and planter, this application being a division of application for patent filed by me April 9, 1903, and designated by Serial No. 151,831.

The object of the present invention is to so mount the seed-tube and coöperating parts as to permit adjustment of the tube to regulate the depth of planting and character of soil into which the seed falls.

With this object in view the invention consists in certain novel features of construction and combinations and arrangements of parts, as will be more fully hereinafter described, and pointed out in the claims.

In the accompanying drawings, Figure 1 is a view in side elevation illustrating my improvements, and Fig. 2 is a view in section on the line *x x* thereof.

1 represents a standard to the lower end of which a lister 2 is secured. A rearwardly-extending bracket 3 is secured to standard 1 and has a slot 4 therein to receive a clamping-bolt 5, also passed through slots in a subsoil-standard 6 and a plate 7 beside the subsoil-standard to clamp them securely together, yet permit of adjustment of the subsoiler 8, secured to the lower end of standard 6. Plate 7 has a wedge 9 integral therewith and located between the forward edge of the subsoil-standard and a lug 10 on bracket 3, so that by adjusting the wedge 9 vertically the subsoiler 8 can be set more or less on its point.

An offset extension 11 is provided on bracket 3 and made with an inclined slot 12 to receive a bolt 13, also passed through an elongated slot 14 in a web at the rear of seed-dropping tube 15, and hold the latter directly behind the subsoiler. The upper end of this seed-tube 15 has a forwardly-projecting lug 16 pivoted to the upper end of subsoil-standard by a bolt 17. By so mounting the seed-tube its lower end can be adjusted back and forth, and as its connection with bracket 3 is through an inclined slot this adjustment of the tube varies its depth of planting. When the tube is set in the forward position, the seed will drop to the bottom of the furrow; but when set farther back more or less soil will fall to the bottom of the furrow in advance of the seed, thus depositing the seed on pulverized soil. The amount of pulverized or loose soil on which the seed is deposited may therefore be regulated by adjusting the seed-tube back and forth.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a lister, the combination with a standard and subsoiler behind the same, of a seed-tube pivotally supported to regulate the depth of planting and means for securing said tube at any desired adjustment.

2. In a lister, the combination with a standard, a rearwardly-projecting bracket secured to the standard, and a subsoiler adjustably secured to said bracket, of a seed-dropping tube pivotally adjustable on the bracket in rear of the subsoiler to regulate the depth of planting, said tube and subsoiler bearing such relation to each other, that when the tube is adjusted in one position it will deposit seed into the bottom of the furrow, and when adjusted to another position it will drop seed upon loose soil deposited into the furrow by the subsoiler.

3. In a lister, the combination with a standard, a rearwardly-projecting bracket secured thereto, and a subsoil-standard adjustably secured to the bracket, of a seed-tube pivotally secured at its upper end to the subsoil-standard and a clamping-bolt passed through a vertical slot in an extension on the seed-tube, and through an inclined slot in the bracket, to secure the seed-tube at any incline desired.

In testimony whereof I have signed this specification in the presence of two subscribing witnesses.

CALVIN R. DAVIS.

Witnesses:
 EDWIN NICAR,
 F. C. NIPPOLD.